Patented Oct. 6, 1942

2,298,078

UNITED STATES PATENT OFFICE 2,298,078

PLASTIC MASSES SIMILAR TO FACTICE AND LINOXYN

Werner Wolff, Ludwigshafen-on-the-Rhine, Germany, assignor, by mesne assignments, to General Aniline & Film Corporation, New York, N. Y., a corporation of Delaware No Drawing. Application August 5, 1939, Serial No. 288,593. In Germany August 15, 1938

5 Claims. (Cl. 260—23)

The present invention relates to interpolymerisation products of vinyl ethers having a plurality of vinyl groups in the molecule and esters of saturated alcohols with tall oil.

I have found that interpolymerisation products capable of wide use are obtained by polymerising tall oil esterified, with saturated alcohols in admixture with vinyl ethers having a plurality of vinyl groups in the molecule, and if desired with further vinyl compounds.

In the interpolymerisation it is possible to start from tall oil esters of a great variety of saturated alcohols, as for example from esters of monohydric alcohols, such as methyl, ethyl, butyl, lauryl or benzyl alcohol, or of polyhydric alcohols, such as the glycols and polyglycols or glycerine, trimethylol ethane or propane, hexanetriol, and also from mixed esters of tall oil, a polybasic carboxylic acid such as succinic or phthalic acid and a polyhydric alcohol which already have resinous properties, or from thickened tall oil esters of saturated alcohols. The thickened tall oil esters may be obtained from tall oil esters by the action of heat, if desired in the presence of oxygen or compounds yielding oxygen or of acid-reacting condensing agents, as for example boron fluoride.

Suitable vinyl ethers having a plurality of vinyl groups in the molecule are for example glycol and polyglycoldivinyl ethers or octadecanediol divinyl ether.

As further compounds to be polymerised therewith there may be mentioned vinyl ethers of monohydric alcohols and vinyl esters, acrylic compounds and other vinyl compounds.

The interpolymerisation may be carried out in the manner usual for polymerisation reactions, as for example by simple heating of the mixtures, in the presence of agents giving off oxygen or acid-reacting condensing agents, in the presence or absence of solvents or diluents and in some cases also in aqueous emulsion, in continuous or interrupted operation.

Indifferent resins, waxes, paraffin wax, pigments, fillers and similar substances which are often used together with the interpolymerisation products, may also be present during the polymerisation. The said substances may also be added, if desired, to the finished polymerisation products.

The polymerisation products obtained are masses similar to factice or linoxyn. They are suitable for the purposes for which factice or linoxyn are used, in particular as binding agents for floor covering masses or as additions to rubber instead of factice.

The following example will further illustrate how my present invention may be carried out in practice but the invention is not restricted to this example. The parts are by weight.

Example

To a mixture of 12.7 parts of tall oil glycerine ester, 4.7 parts of diethylene glycol divinyl ether, 28 parts of vinyl ethyl ether, 100 parts of vinyl methyl ether and 8.7 parts of a resin obtained by condensation of equomolecular amounts of colophony and maleic anhydride and subsequent esterification with glycerine, there is added at about 10° C. such an amount of a 5 per cent solution of boron fluoride dihydrate in dioxane that noticeable polymerisation takes place.

A part of the vinyl methyl ether takes no part in the polymerisation and serves merely as a diluent and also, by boiling under reflux, as an agent for regulating the temperature. By additional external cooling, the polymerisation mixture may be kept constant at about 9° C. The finished interpolymerisation product, in which only about 46 parts of polymerised vinyl methyl ether are contained, is a brown, friable, elastic mass similar to linoxyn. The product when blown with oxygen or oxygen-containing gases, such as air, becomes more plastic and may then be added with greater amounts of fillers than without such an aftertreatment.

When the ethylene glycol ester or the butyl ester of tall oil is used instead of the glycerine ester, products having the same good properties are obtained.

What I claim is:

1. Plastic masses similar to factice and linoxyn comprising interpolymerisation products of at least a vinyl ether having a plurality of vinyl groups in the molecule and of esters of saturated alcohols with tall oil.

2. Plastic masses similar to factice and linoxyn comprising interpolymerisation products of at least a vinyl ether having a plurality of vinyl groups in the molecule and of esters of saturated polyhydric alcohols with tall oil.

3. Plastic masses similar to factice and linoxyn comprising interpolymerisation products of at least a vinyl ether having a plurality of vinyl groups in the molecule and of the glycerine ester of tall oil.

4. Plastic masses similar to factice and linoxyn comprising interpolymerisation products of glycol divinyl ethers and of esters of saturated alcohols with tall oil.

5. Plastic masses similar to factice and linoxyn comprising an interpolymerisation product of tall oil glycerine ester, diethylene glycol divinyl ether and at least one vinyl ether of a monohydric aliphatic alcohol.

WERNER WOLFF.